United States Patent
Weng et al.

(10) Patent No.: US 6,931,551 B2
(45) Date of Patent: Aug. 16, 2005

(54) METHOD AND SYSTEM FOR DATA ENCRYPTION/DECRYPTION IN A CLIENT-SERVER ARCHITECTURE

(75) Inventors: Chien Sen Weng, Taipei (TW); Hsiang Tsun Yen, Taipei (TW)

(73) Assignee: BenQ Corporation, Taoyuan (TW)

(*) Notice: Subject to any disclaimer, the term of this patent is extended or adjusted under 35 U.S.C. 154(b) by 799 days.

(21) Appl. No.: 09/824,650

(22) Filed: Apr. 4, 2001

(65) Prior Publication Data

US 2002/0053030 A1 May 2, 2002

(30) Foreign Application Priority Data

Oct. 27, 2000 (TW) ........................................ 89122775 A

(51) Int. Cl.$^7$ .............................................. G08F 12/14
(52) U.S. Cl. ........................ 713/201; 715/769; 380/201; 713/165
(58) Field of Search .......................... 713/201; 345/769

(56) References Cited

U.S. PATENT DOCUMENTS

| | | | | |
|---|---|---|---|---|
| 5,414,455 A | * | 5/1995 | Hooper et al. ................ | 725/88 |
| 5,577,125 A | * | 11/1996 | Salahshour et al. ........... | 380/54 |
| 5,737,009 A | * | 4/1998 | Payton ......................... | 725/93 |
| 5,764,235 A | * | 6/1998 | Hunt et al. ................... | 345/428 |
| 5,867,144 A | * | 2/1999 | Wyard ......................... | 345/769 |
| 6,023,506 A | * | 2/2000 | Ote et al. .................... | 713/165 |
| 6,615,349 B1 | * | 9/2003 | Hair ............................ | 713/165 |

FOREIGN PATENT DOCUMENTS

| | | | | | |
|---|---|---|---|---|---|
| FR | 2700231 A1 | * | 7/1994 | ............ | H04N/7/16 |
| GB | 2331814 A | * | 6/1999 | ............ | G06F/9/445 |
| JP | 64-004139 | | 1/1989 | | |
| JP | 07-092908 | | 4/1995 | | |
| JP | 08-044527 | | 2/1996 | | |
| JP | 10-177523 | | 6/1998 | | |
| JP | 11-136231 | | 5/1999 | | |

OTHER PUBLICATIONS

Dynacrypt, Jun. 05, 2002, pp. 1–2 <http://www.dynacrypt.com.vu/help/dragdrop.htm>.*
Menezes et al "Handbook of Applied Cryptography", 1997, CRC Press, p. 388.*

* cited by examiner

*Primary Examiner*—Andrew Caldwell
*Assistant Examiner*—Michael Pyzocha
(74) *Attorney, Agent, or Firm*—Quintero Law Office

(57) ABSTRACT

A method and system for data encryption/decryption in client-server architecture, In the invention, channel data is differentiated into a plurality of channels. The data encryption/decryption system comprises a service system and a client system. The service system is used for transmitting encrypted channels and the client system is used for receiving encrypted channels. The service system comprises an encryption unit, which encrypts a plurality of channels with various encrypting means. The client system comprises a channel-receiving unit and a plurality of decryption units; wherein the channel-receiving unit is used for selecting channels and decryption units are required to be moved onto the top of the receiving unit of respective channels to start encryption. Then displays decrypted channels on the decryption unit.

29 Claims, 6 Drawing Sheets

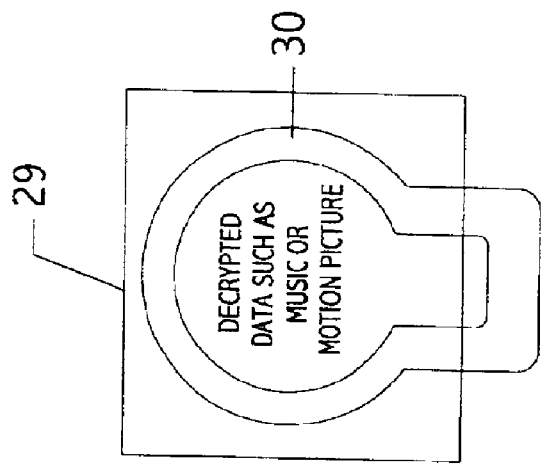
FIG. 4 (B)
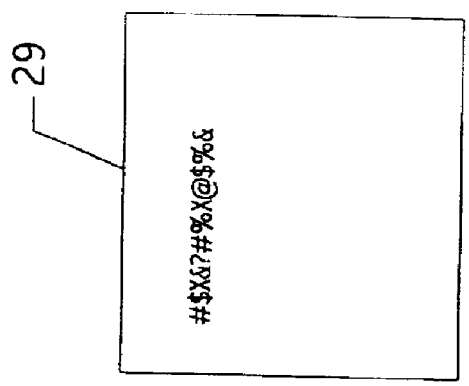
FIG. 4 (A)
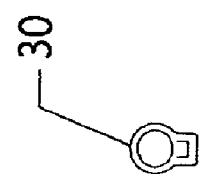

METHOD AND SYSTEM FOR DATA ENCRYPTION/DECRYPTION IN A CLIENT-SERVER ARCHITECTURE

REFERENCE TO RELATED APPLICATIONS

The present application claims priority to Taiwan application No. 089122775 entitled "Method and system for data encryption/decryption in a client-server architecture" filed on Oct. 27, 2000.

BACKGROUND OF THE INVENTION

1. Field of the Invention

This invention generally relates to a system for data encryption/decryption. Through drag-and-drop a decryption icon onto a window interface, the encrypted data is decrypted and displayed in a window provided by the decryption icon.

2. Description of the Related Art

Internet has become an essential tool to access to information sources nowadays. The sources make available by Internet covers various topics such as science, literature etc., whereas it also contributes to the rapid spread of information concerning violence, pornography, crime-related materials.

Focus on the complication of the Internet resources as mentioned, functions to categorize web content has been added to current web browsing applications to screen unwanted materials for users who requires it. However, due to the fact that configuration for such function in browsing applications is manual and the censorship standards remains a controversial issue, content censor is open to better solutions.

In addition, there are websites using member registrations to differentiate their audience. The method allows web administraters to offer a more comprehensive service, yet it does not serve as an efficient means for content censor. Otherwise, often websites only offer warnings such as "This website contains explicit language and images, adult only".

Furthermore, there is also means to screen unwanted websites by blocking access to the website or specific web pages.

SUMMARY OF THE INVENTION

The invention provides a method and system for data encryption/decryption in a client-server architecture to facilitate censorship of the web content and at the same time to establish a fee-based membership. The invention divides the content to distribute on the internet into a plurality of channels, then decides which channels should be encrypted. Encryption can either proceed at the server or client. Client is free to choose channels to watch. If the chosen channels are encrypted and as a result unreadable or scramble, then client has to request or purchase a decryption device for channel decryption. As the decryption device is installed in the client computer system. The decryption device is represented as an icon such as a magnifier for the client to drag and drop onto the images of the channels which the client wish to read or watch. It followed that, the decryption device then confirm whether the channels beneath it is the aiming channels. If yes, the device proceed to decrypt channels so that the client can read or watch the corresponding decrypted channels lies beneath the decryption device. Once the decryption device is removed from the channel image, then the content of the channel will be returned to the encrypted state and become unreadable or scramble again.

Moreover, password authentication is available before dragging and dropping the decryption device in order to prevent misuse of the device by a third party.

BRIEF DESCRIPTION OF THE DRAWINGS

The following detailed description, which is given by way of example, and not intended to limit the invention to the embodiments described herein,can best be understood in conjunction with the accompanying drawings,in which:

FIG. 4 illustrates a user interface from the client in an embodiment according to the present invention;

DETAILED DESCRIPTION OF THE INVENTION

Figure 1:
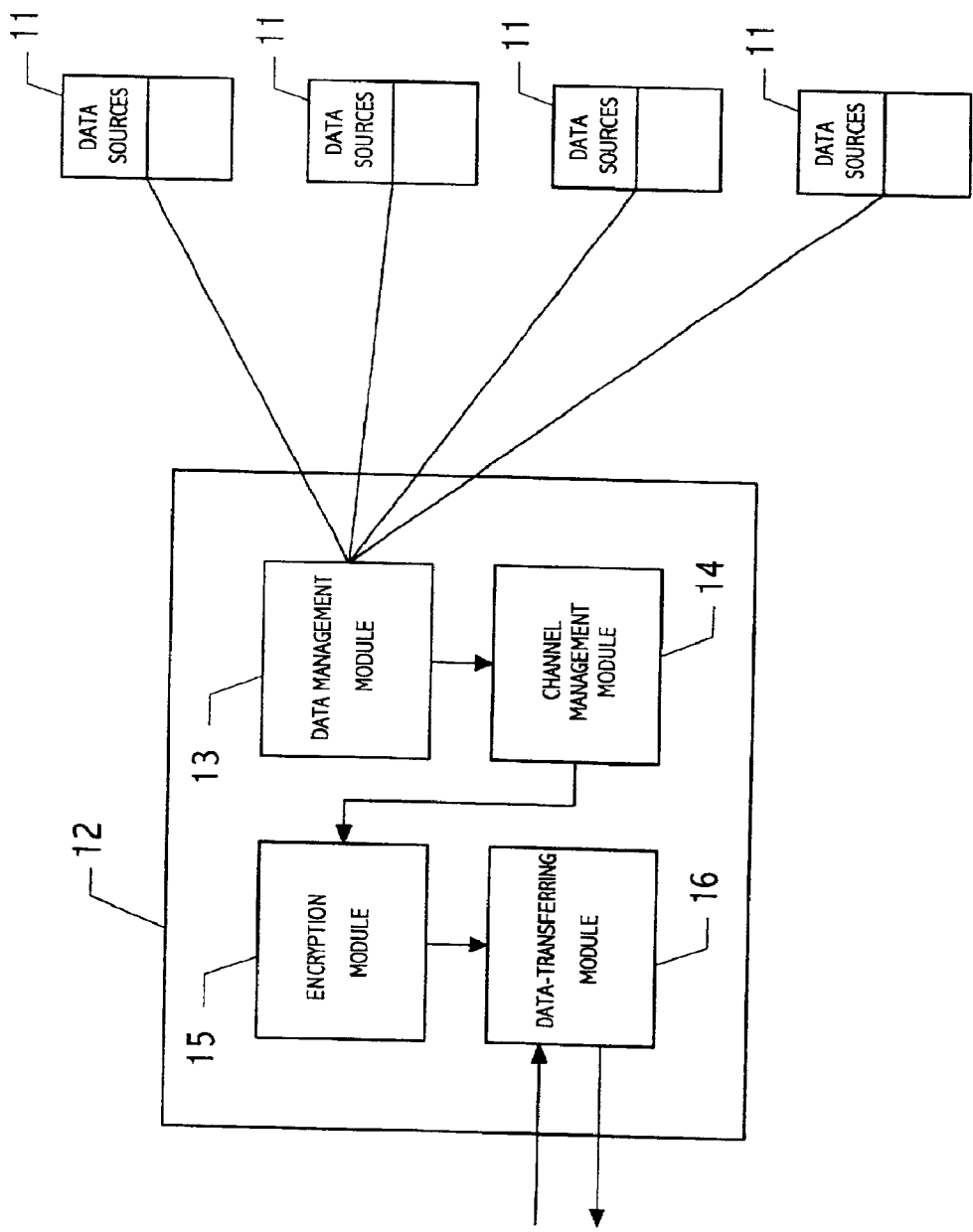
FIG. 1 illustrates a block diagram illustrating the server according to the present invention.

The embodiment employing the invention discloses a method and system for data encryption/decryption in a client-server architecture. FIG. 1 is a block diagram illustrating data encryption of a server 12 according to the invention. The server 12 includes a data management module 13, a channel management module 14, an encryption module 15 and a data-transferring module 16. As a plurality of data sources 11 are stored in the data management module 13, The channel management module 14 divides a plurality of data source 11 into a plurality of channels based on the content censorship or fee-purpose. It follows that the encryption module 15 then separately encrypts each channel with a plurality of encryption units, which requires different means for decryption to strengthen the control over channels. That can effectively prevent users decrypt all encrypted channels with encryption means of one. After the separative encryption of each channel, the data-transferring module 16 waits for channel request from the client. Upon receiving the requests, the data-transferring module 16 transfers encrypted channel in the form of data stream to the client making the request. Moreover, the encryption module 15 also offers channels without encryption which resulted in a data stream transferred by the data-transferring module 16 which may contain both encrypted channels and unencrypted channels.

Figure 2:
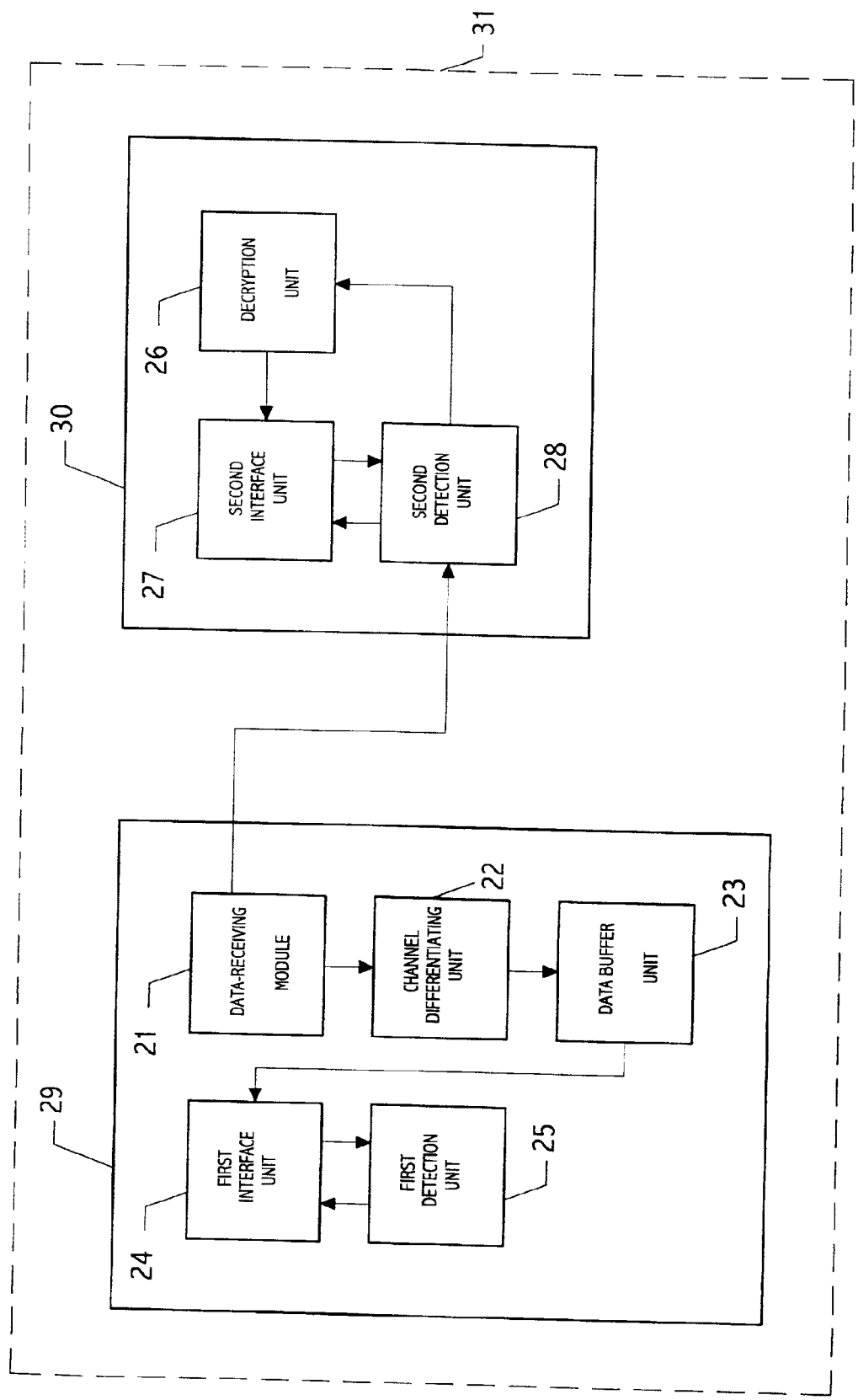
FIG. 2 illustrates a block diagram illustrating the client according to the present invention.

Referring to FIG. 2, a client 31 includes a channel-receiving module 29 and a decryption module 30. When the channel-receiving module 29 receives the data stream at the client 31, the decryption module 30 is required for the decryption. The channel receiving module 29 using a data-receiving module 21 to make a channel request, then receive the data stream from the server 12. A channel differentiating unit 22 recovers the data stream into a plurality of channels. The channels are temporarily stored in data buffer unit 23. The first interface unit 24 is a window interface, and users can select or flip to different channels with it. However, users can select one channel at one time. The format at the performing window environment follows the format of the channel temporarily stored in a data buffer unit 23. For example, if channel A contains graphics then channel data will performed the graphics it intended to render. In the same way, If channel B is audio, then the performing of decrypt channel will be audio. If channel C is multimedia format, then the performing of channel C will be multimedia. However, it is restricted to the condition that the channel data temporarily stored in the data buffer unit 23 is unencrypted. Concerning encrypted data, the first interface unit 24 regards it as text files which results in scrambles shown in the window. The channel-receiving module 29 further comprises a first detection unit 25 for receiving encrypted data of the first interface unit 24. It is also responsible for detecting whether there is any other windows lies on top of the window provided by the first interface unit 24. In the same drawing, the first detection unit 25 of the decryption module 30 is used for detecting whether there is a decryption module 30 above it when channel performed in the first interface unit 24 has the same decryption key as the decryption module 30. If yes, first detection unit 25 will transfer encrypted data to the decryption module 30. Similarly, the second detection unit 28 is used to detect whether a channel-receiving module 29 is under itself when the decryption key of decryption module 30 is the same with channel performed on the first interface unit 24. If yes, the second detection unit 25 then receives the encrypted data from the first detection unit 25. However, after the decryption module 30 is removed from the top of the channel-receiving module 29, decryption terminates. Upon second detection unit 25 receiving the encrypted data, decryption unit 26 then proceed to decryption and display decrypted data with the second interface unit 27, The second interface unit 27 is a window interface and determines the window interface executing environment according to the format of the decrypted data. For example, if the data is graphics then it performs graphics, if It is audio then It performs audio and if it is multimedia then it performs multimedia. The display format is loyal to the decrypted date format.

Figure 3:
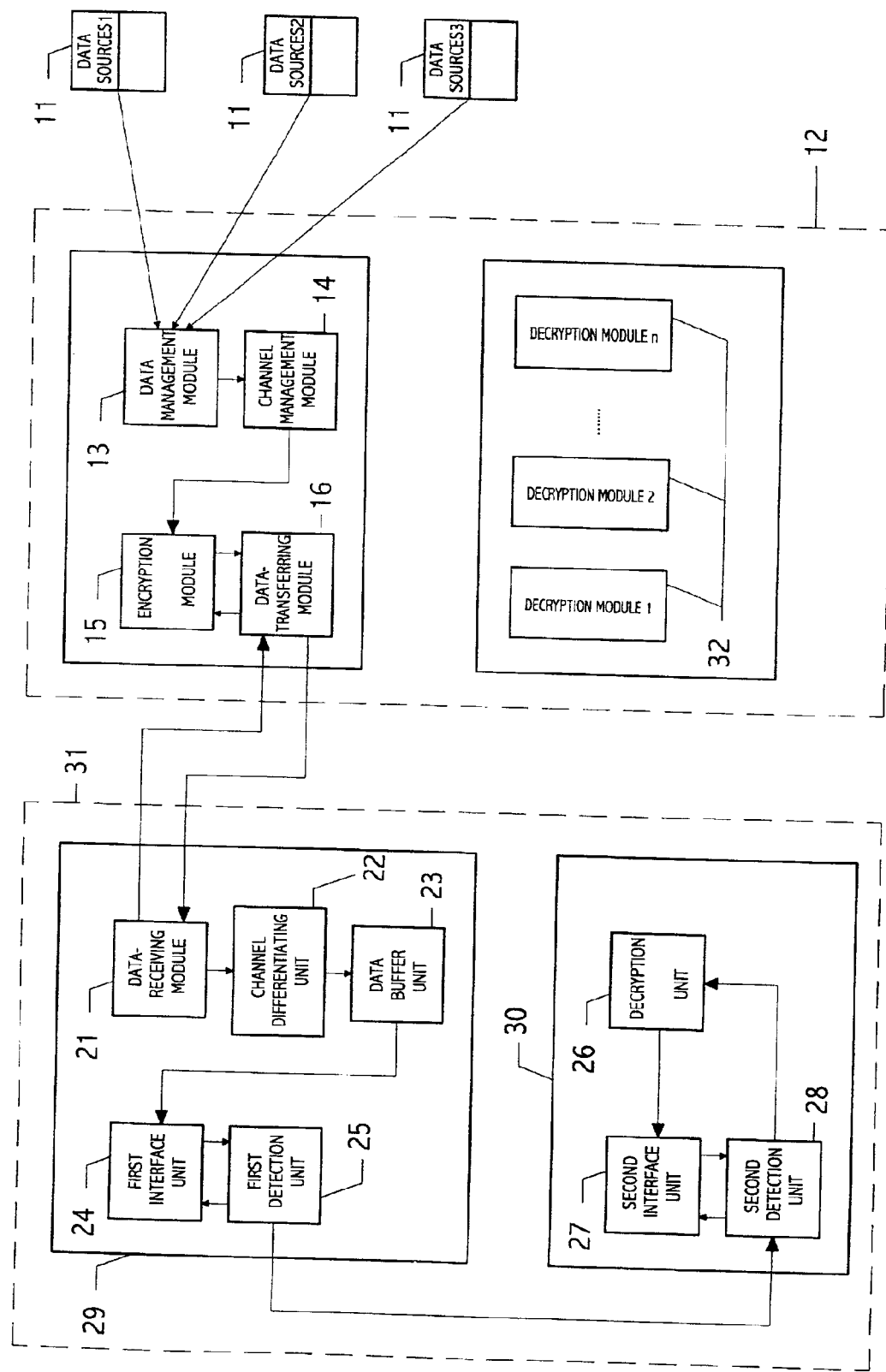
FIG. 3 illustrates a block diagram illustrating the combination of the server and the client according to the present invention.

FIG. 3 is a combination of FIG. 1 and FIG. 2. In the FIG. 3, server 12 further comprises a plurality of decryption module 32. In which, the number of the decryption module 32 depends on the numbers of the channel and means of encryption. One decryption module 32 corresponds to one channel. The client 31 downloads each decryption module 32. As shown in the drawing, the decryption module 30 is represented as an icon on the screen at the client 31. In the FIG. 4(*a*), decryption module 30 is represented as a magnifier icon, users can drag and drop the decryption module 30 onto the channel-receiving module 29 via any input device such as a mouse. The decryption module 30 then determines the window size of the decryption module 30 based on the window size of the channel-receiving module 29. Followed by said decryption means to decrypt and display channel data on the decryption module 30 as shown in the FIG. 4(*b*). Provided the decryption module 30 is removed from the channel-receiving module 29, then it returns to the state as shown in the FIG. 4(*a*). For strengthening the control over the use of the decryption module 30, a password authentication is available before the drag and drop of the decryption module 30 takes place.

Figure 5:
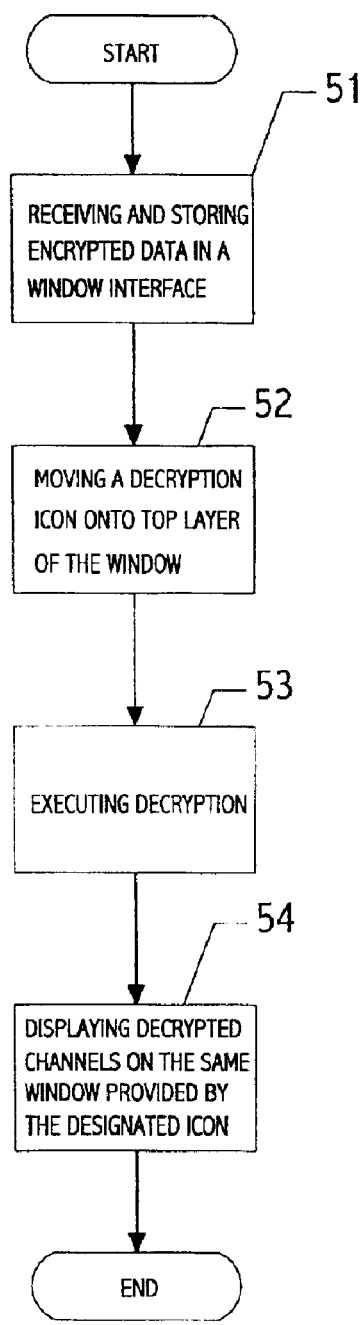
FIG. 5 illustrates a flowchart of the encryption steps according to the present invention.

Referring to FIG. 4, the invention further discloses a method for decryption. As in the FIG. 5, in the step 51, receiving and storing encrypted data in a window Interface. Then in the step 52, the method proceeds to moving a decryption icon onto top layer of the window. At step 53, the control flows to executing decryption. Followed that it moves to step 54 displaying decrypted channels on the same window provided by the designated icon.

Figure 6:
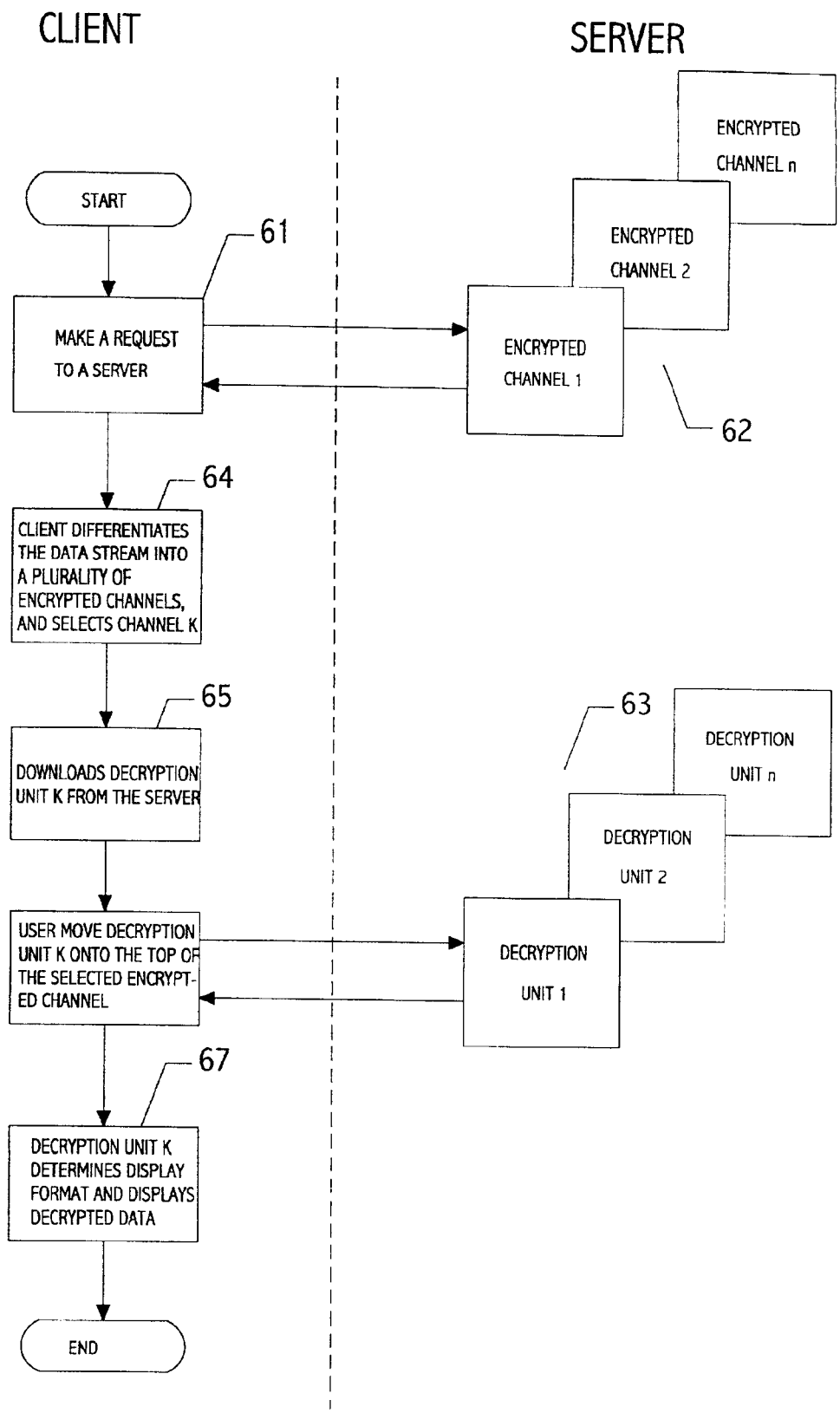
FIG. 6 illustrates a flowchart of the encryption/decryption steps according to the present invention.

With reference to to FIG. 3, an embodiment according to the invention shown in the FIG. 6 further discloses a method for data encryption/decryption. Server divides data into a plurality of channels, encrypts each channel separatively and generates a plurality of encrypted channels 62. A client executes step 61 to make a request to a server, followed to receive a data stream of encrypted channels transferred in response to the request from server. In the step 64, client differentiates the data stream into a plurality of encrypted channels, and then the client selects channel K. In the step 65, the client makes a request for channel K to the server and downloads decryption unit K from the server. In step 66, user move decryption unit K onto the top of the selected channel K and generates decrypted data. According to the format of the decrypted data, decryption unit K determines display format and displays decrypted data in the step 67.

In addition, in step 66, moving decryption unit K onto the top of the selected channel K, for strengthening the control over the use of decryption unit K, password authentication is available before the action.

It is thought that method and system for data encryption/decryption in a client-server architecture and many of its attendant advantages will be understood from the foregoing description and it will be apparent to one skilled in the art that various changes may be made in the form, construction and arrangement of the parts thereof without departing from the spirit and scope of the invention or sacrificing all of its material advantages, the form hereinbefore described being merely a preferred or exemplary embodiment thereof. It is clear that other embodiments equivalent to the disclosed preferred embodiments could also be developed using components that may be developed in the future.

What is claimed is:

1. A system for data encryption/decryption in a client-server architecture, comprising:

a server apparatus, comprising:
 a data management module for storing a plurality of data sources;
 a channel management module for differentiating said data sources into a plurality of channels;
 a encryption module for generating a plurality of encrypted channels based on corresponding encryption methods according to said channels; and
 a data-transferring module for transferring a data stream of said corresponding encrypted channel upon receiving requests of said channels; and a client apparatus, comprising:
 a channel-receiving module, represented as a window interface, comprising:
  a data-receiving unit for making said request and receiving said data stream;
  a channel differentiating unit for differentiating said data stream of said encrypted channels;
  a data buffer unit for saving said encrypted channels;
  a first interface unit for controlling said window interface over displaying said encrypted channels from said data buffer unit;
  a first detection unit for detecting whether or not a designated icon is positioned on said window interface; and
 a decryption module represented as said designated icon, comprising:
  a second interface unit for controlling the display of said designated icon;
  a second detection unit for sending a decryption signal as said designated icon is positioned on said window interface;
  a decryption unit for starting decrypting said encrypted channels upon receiving said decryption signal and generating corresponding decrypted channels, then displaying said decrypted channels on a decryption window provided by the designated icon.

2. The system of claim 1, wherein said channel-receiving module is downloaded to said client apparatus via network.

3. The system of claim 1, wherein said decryption module is downloaded to said client apparatus via network.

4. The system of claim 1, wherein said decryption module is dragged and dropped onto the receiving module of said channels with input equipments.

5. The system of claim 4, wherein password authentication is available before dragging and dropping said decryption module.

6. The system of claim 1, wherein content of said channel contains static texts, images or both.

7. The system of claim 1, wherein content of said channel contains animated texts, images or both.

8. The system of claim 1, wherein content of said channel is audio.

9. A system for data encryption/decryption in a client-server architecture, comprising:
   a server apparatus for transmitting said data, differentiating said data into a plurality of channels, said service apparatus comprising a plurality of encryption units which encrypt said channels and generates a plurality of corresponding decryption units; and
   a client apparatus for receiving said channels, comprising a channel-receiving unit for said channels, said client apparatus accessing a decryption unit, moving said decryption unit onto the top layer of said channel-receiving unit and starting said channel decryption.

10. The system of claim 9, wherein said channel-receiving unit is a window interface.

11. The system of claim 9, wherein said decryption unit can be a magnifier icon or other similar icons.

12. The system of claim 9, wherein said channel-receiving module is downloaded to said client apparatus via network.

13. The system of claim 9, wherein said decryption unit is downloaded to said client apparatus via network.

14. The system of claim 9, wherein said channel-receiving unit is downloaded to said client apparatus from a storage medium.

15. The system of claim 9, wherein said decryption unit is downloaded to said client apparatus from a storage medium.

16. The system of claim 9, wherein said decryption unit is dragged and dropped onto the top layer of said channel-receiving unit with input equipments.

17. The system of claim 16, wherein password authentication is available before dragging and dropping the decryption module.

18. A system for data encryption/decryption in a client-server architecture, comprising:
   a channel-receiving unit represented as a window interface for receiving encrypted data; and
   a decryption unit represented as an icon for decryption and required to be moved onto the top layer of receiving unit of the channel to start said decryption.

19. The system of claim 18, wherein said decryption unit is dragged and dropped onto the top layer of said channel-receiving unit with a mouse or other input equipments.

20. The system of claim 19, wherein password authentication is available before dragging and dropping the decryption module.

21. A system for data encryption/decryption in a client-server architecture and differentiating said data into a plurality of channels, comprising a service system for transmitting said channels, encrypting the channels separately and offering corresponding a plurality of decryption units for the use of decryption, wherein said decryption unit is represented as a icon and requires to be moved onto a window interface of said channel to start encryption, and said decryption unit temporarily stores and displays said decrypted channels.

22. A method for data encryption/decryption in a client-server architecture, comprising:
   receiving and storing said data encrypted in a window interface;
   moving a decryption icon of said encrypted data onto top layer of said window interface; and
   executing decryption and displaying said decrypted data on a decrypted window provided by the designated icon.

23. The method of claim 22, wherein said decryption icon can be a magnifier icon or other similar icons.

24. The method of claim 22, wherein said decryption icon is dragged and dropped onto the top layer of said channel-receiving unit with input equipments.

25. The system of claim 24, wherein password authentication is available before dragging and dropping the decryption icon.

26. A method for data encryption/decryption in a client-server architecture, comprising:
   differentiating data of said server into a plurality of channels;
   encrypting a plurality of channels separately and generating corresponding decryption units and a plurality of encrypted channels;
   transferring a data stream of said encrypted channels upon receiving a first request for said channels at said server;
   making said first request and receiving said data stream at the client;
   differentiating said data stream into said encrypted channels at the client;
   moving a decryption unit onto said encrypted channels and generating said decrypted channels at said client;
   receiving said decrypted channels at said decryption unit of said client.

27. The method of claim 26, wherein said decryption unit can be a magnifier icon or other similar icons.

28. The method of claim 26, wherein said decryption unit is dragged and dropped onto the top layer of said encrypted channel with input equipments.

29. The system of claim 28, wherein password authentication is available before dragging and dropping said decryption unit.

* * * * *